(12) United States Patent
Cheng et al.

(10) Patent No.: US 10,757,039 B2
(45) Date of Patent: Aug. 25, 2020

(54) APPARATUS AND METHOD FOR ROUTING DATA IN A SWITCH

(71) Applicant: Intel Corporation, Santa Clara, CA (US)

(72) Inventors: Albert S. Cheng, Bellevue, WA (US); Thomas D. Lovett, Portland, OR (US); Michael A. Parker, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/531,688

(22) PCT Filed: Dec. 24, 2014

(86) PCT No.: PCT/US2014/072378
§ 371 (c)(1),
(2) Date: May 30, 2017

(87) PCT Pub. No.: WO2016/105419
PCT Pub. Date: Jun. 30, 2016

(65) Prior Publication Data
US 2017/0339071 A1    Nov. 23, 2017

(51) Int. Cl.
*H04L 12/947* (2013.01)
*H04L 12/835* (2013.01)
(Continued)

(52) U.S. Cl.
CPC .............. *H04L 49/25* (2013.01); *H04L 45/74* (2013.01); *H04L 47/12* (2013.01); *H04L 47/122* (2013.01);
(Continued)

(58) Field of Classification Search
None
See application file for complete search history.

(56) References Cited

U.S. PATENT DOCUMENTS 7,903,558 B1 *   3/2011   Dropps .................. H04L 47/26
                                                    370/232
8,050,260 B1    11/2011   Dropps et al.
(Continued)

OTHER PUBLICATIONS

International Search Report and Written Opinion dated Sep. 22, 2015 from International Application No. PCT/US2014/072378, 14 pages.
(Continued)

*Primary Examiner* — Kevin C. Harper
*Assistant Examiner* — Derrick V Rose
(74) *Attorney, Agent, or Firm* — Schwabe, Williamson & Wyatt, P.C.

(57) ABSTRACT

Apparatuses, methods and storage medium associated with routing data in a switch are provided. In embodiments, the switch may include route lookup circuitry determine a first set of output ports that are available to send a data packet to a destination node. The lookup circuitry may further select, based on respective congestion levels associated with the first set of output ports, a plurality of output ports for a second set of output ports from the first set of output ports. An input queue of the switch may buffer the data packet and route information associated with the second set of output ports. The switch may further include route selection circuitry to select a destination output port from the second set of output ports, based on updated congestion levels associated with the output ports of the second set of output ports. Other embodiments may be described and/or claimed.

22 Claims, 4 Drawing Sheets

(51) Int. Cl.
    *H04L 12/741* (2013.01)
    *H04L 12/801* (2013.01)
    *H04L 12/935* (2013.01)
    *H04L 12/933* (2013.01)
    *H04L 12/803* (2013.01)

(52) U.S. Cl.
    CPC ............ *H04L 47/30* (2013.01); *H04L 49/101* (2013.01); *H04L 49/30* (2013.01)

(56) References Cited

U.S. PATENT DOCUMENTS

| | | | | |
|---|---|---|---|---|
| 2003/0103501 | A1* | 6/2003 | Clem | H04L 12/6418 370/389 |
| 2003/0195983 | A1* | 10/2003 | Krause | H04L 47/12 709/238 |
| 2004/0213224 | A1* | 10/2004 | Goudreau | H04L 29/06 370/389 |
| 2005/0088969 | A1 | 4/2005 | Carlsen et al. | |
| 2007/0010205 | A1* | 1/2007 | Wielage | H04L 45/60 455/63.3 |
| 2009/0304017 | A1* | 12/2009 | Lee | H04L 45/00 370/412 |
| 2012/0170582 | A1 | 7/2012 | Abts et al. | |
| 2013/0201826 | A1* | 8/2013 | Testa | H04L 47/10 370/230 |
| 2014/0022895 | A1 | 1/2014 | Matthews et al. | |
| 2014/0071828 | A1 | 3/2014 | Wang | |
| 2014/0119193 | A1 | 5/2014 | Ananad et al. | |
| 2014/0140212 | A1* | 5/2014 | Morandin | H04L 49/505 370/235 |
| 2014/0211631 | A1 | 7/2014 | Harmaty et al. | |

OTHER PUBLICATIONS

International Preliminary Report on Patentability dated Jul. 6, 2017 from International Application No. PCT/US2014/072378, 11 pages.
Extend European Search Report dated Jun. 28, 2018 for European Patent Application No. 14909259.5, 7 pages.
Office Action dated Jun. 4, 2019 for European Patent Application No. 14909259.5, 6 pages.

* cited by examiner

APPARATUS AND METHOD FOR ROUTING DATA IN A SWITCH

CROSS REFERENCE TO RELATED APPLICATIONS

The present application is a national phase entry under 35 U.S.C. § 371 of International Application No. PCT/US2014/072378, filed Dec. 24, 2014, entitled "APPARATUS AND METHOD FOR ROUTING DATA IN A SWITCH", which designated, among the various States, the United States of America. The Specifications of the PCT/US2014/072378 Application is hereby incorporated by reference.

TECHNICAL FIELD

The present disclosure relates to the field of networking. More particularly, the present disclosure relates to routing data in switches.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A switch typically includes a number of routing paths to route data packets from one of a plurality of input ports of the switch to one of a plurality of output ports of the switch. The routing paths between the input ports and output ports may become congested.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
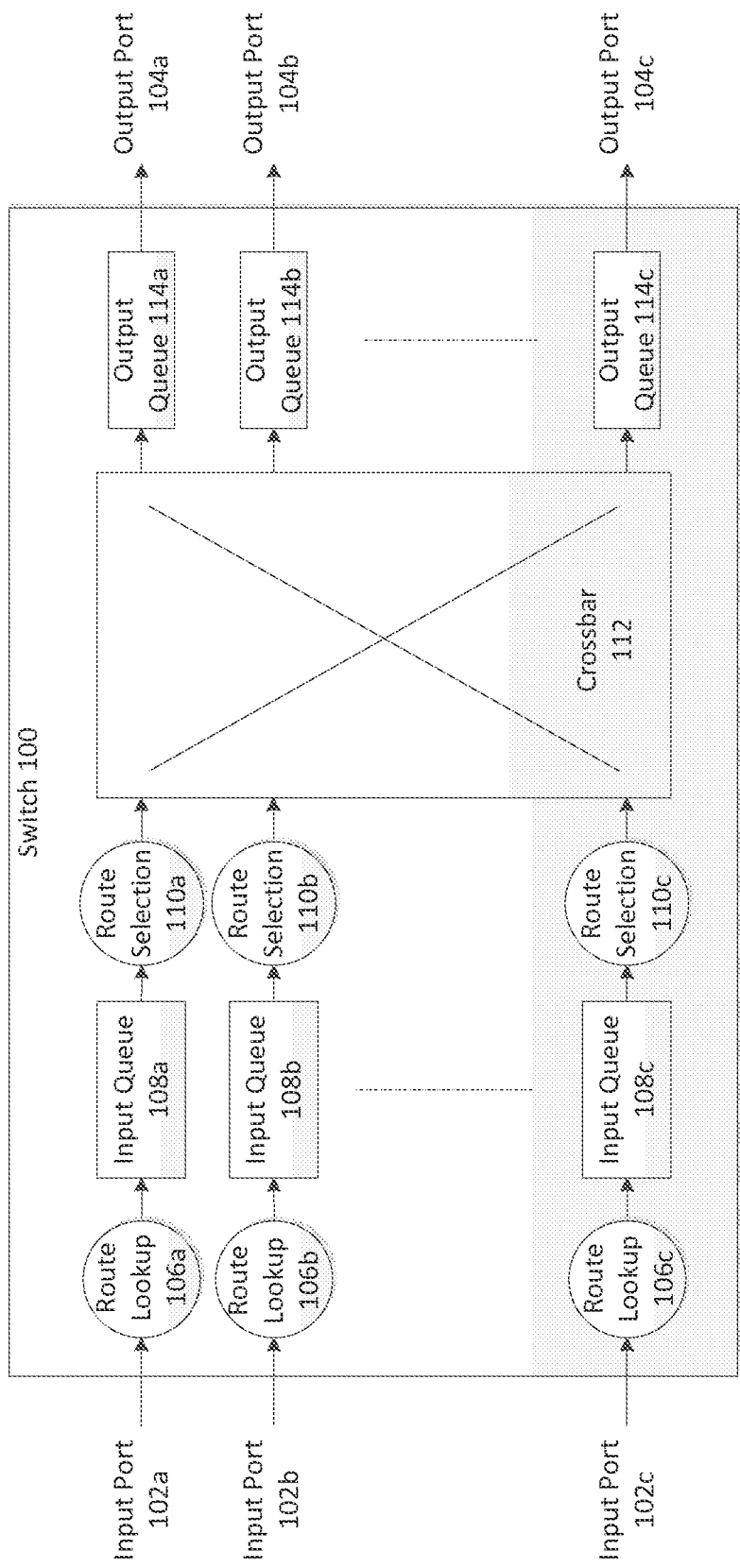
FIG. 1 illustrates a block diagram of a switch, according to the disclosed embodiments.

Apparatuses, methods and storage media associated with routing data in a switch are provided herein. In embodiments, the switch may include a plurality of input ports and a plurality of output ports. The switch may receive a data packet at an input port that is to be routed to a destination node. The switch may include route lookup circuitry, coupled to the input port, to determine a first set of output ports that are available to send the data packet to a destination node. The lookup circuitry may further select, based on respective congestion levels associated with the first set of output ports, a plurality of output ports for a second set of output ports from the first set of output ports.

An input queue of the switch may buffer the data packet and route information associated with the second set of output ports. The switch may further include route selection circuitry to select a destination output port from the second set of output ports, based on updated congestion levels associated with the output ports of the second set of output ports. The destination output port may be selected, for example, when the data packet is ready to be removed from the input queue or after the data packet is removed from the input queue. The switch may further include a crossbar to route the data packet to the selected destination output port (e.g., via an associated output queue).

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates a switch 100 in accordance with various embodiments. Switch 100 may include a plurality of input ports 102a-c and a plurality of output ports 104a-c. In one embodiment, the switch 100 may include 64 input ports 102a-c and 64 output ports 104a-c, although other embodiments may include any suitable number of input ports 102a-c and output ports 104a-c. The switch 100 may route data (e.g., data packets) received at an input port 102a-c to one of the output ports 104a-c. In some embodiments, the switch may be capable of routing data from any of the input ports 102*a-c* to any of the output ports 104*a-c*. In some embodiments, the switch 100 may be coupled to a plurality of processors (not shown) and may be used to route data between the plurality of processors. In some embodiments, a plurality of switches (e.g., switches 100) may be coupled to one another to form a fabric or network to route data between a plurality of processors. The plurality of switches of the fabric or network may be interconnected to provide multiple routing paths between two processors.

In various embodiments, the switch 100 may further include route lookup circuitry 106*a-c* coupled to respective input ports 102*a-c*, input queues 108*a-c* coupled to respective route lookup circuitry 106*a-c*, and route selection circuitry 110*a-c* coupled to respective input queues 108*a-c*, as shown in FIG. 1. The switch 100 may further include a crossbar 112 (also referred to as crossbar circuitry 112) coupled to the plurality of route selection circuitry 110*a-c* and to a plurality of output queues 114*a-c* of the switch. The individual output queues 114*a-c* may be coupled to respective output ports 104*a-c*.

An example routing process is described below for a data packet that is received at the input port 102*a*. Aspects of the routing process may be performed by the route lookup circuitry 106*a*, input queue 108*a*, and route selection circuitry 110*a* associated with the input port 102*a*, as further explained below. A similar routing process may be used for data packets received at other input ports 102*b-c* of the switch 100, and may be performed by the associated route lookup circuitry 106*b-c*, input queue 108*b-c*, and route selection circuitry 110*b-c*.

In various embodiments, the input port 102*a* may receive a data packet that is to be sent to a destination node (e.g., coupled to a destination processor). For example, the input port 102*a* may receive a destination local identifier (DLID) associated with the data packet. The DLID may identify the destination node. In some embodiments, the DLID may be included in the data packet.

In various embodiments, the data packet may be an adaptive data packet that is to be adaptively routed by the switch 100. For adaptive data packets, a plurality of the output ports 104*a-c* may be usable to route the adaptive data packet to the destination node. The switch 100 may select the destination output port 104*a-c* to which to route the adaptive data packet, for example based on congestion information as discussed further below. Adaptive data packets are distinguished from deterministic data packets, for which the destination output port 104*a-c* to which to route the deterministic data packet is pre-determined and may not be altered by the switch 100. In embodiments, the data packet may include an indicator (e.g., a bit) to indicate whether the data packet is an adaptive data packet or a deterministic data packet.

In various embodiments, the route lookup circuitry 106*a* may determine a first set of output ports including a plurality of the output ports 104*a-c* that are available to send the data packet to the destination node. In some embodiments, the route lookup circuitry 106*a* may determine the output ports 104*a-c* that are included in the first set based on one or more route tables.

In various embodiments, the route lookup circuitry 106*a* may obtain congestion information that indicates respective congestion levels associated with the output ports 104*a-c* of the first set of output ports. For example, the congestion level associated with a given output port 104*a-c* may indicate a level of congestion for a route of the crossbar 112 that may be used to send the data packet from the input queue 108*a* to the given output port 104*a-c*. The route lookup circuitry 106*a* may obtain the congestion information by examining an amount of data packets stored at respective output queues 114*a-c* associated with the output ports 104*a-c* and/or examining a flow rate of data out of the output port 104*a-c*.

In various embodiments, the route lookup circuitry 106*a* may select a plurality of output ports 104*a-c* for a second set of output ports from the output ports 104*a-c* of the first set of output ports. Accordingly, the second set of output ports may include a subset of the output ports 104*a-c* that are included in the first set of output ports. The route lookup circuitry 106*a* may select the output ports 104*a-c* for the second set of output ports based on the congestion information (e.g., based on the congestion levels associated with the output ports 104*a-c*). For example, the route lookup circuitry 106*a* may select the output ports 104*a-c* of the first set of output ports that have the lowest congestion levels.

In various embodiments, the route lookup circuitry 106*a* may pass the data packet to the input queue 108*a* for buffering. The route lookup circuitry 106*a* may additionally or alternatively pass routing information associated with the data packet to the input queue 108*a* for buffering. The routing information may include information that identifies the output ports 104*a-c* of the second set of output ports. In various embodiments, the input queue 108*a* may buffer (e.g., temporarily store) the data packet and the associated routing information. The input queue 108*a* may store a plurality of data packets and associated routing information while the data packets await routing (e.g., by the crossbar 112) to the destination output queue 114*a-c* and/or destination output port 104*a-c*. Accordingly, the input queue 108*a* may be used to manage congestion in the switch 100 by storing the data packet until routing resources (e.g., in the crossbar 112) are available to route the data packet to the destination output queue 114*a-c* and/or destination output port 104*a-c*.

In various embodiments, after the data packet is buffered in the input queue 108*a*, the route selection circuitry 110*a* may obtain updated congestion information associated with the output ports 104*a-c* of the second set of output ports. The updated congestion information may indicate respective congestion levels associated with the output ports 104*a-c* of the second set of output ports.

In various embodiments, the route selection circuitry 110*a* may select a destination output port (e.g., one of the output ports 104*a-c*) for the data packet based on the updated congestion information. The route selection circuitry 110*a* may then pass the data packet to the crossbar 112 for routing to the destination output port. The route selection circuitry 110*a* may obtain the updated congestion information and/or select the destination output port, for example, when the data packet is ready to be pulled from the input queue 108*a* or after the data packet is pulled from the input queue 108*a*. The data packet may be ready to be pulled from the input queue 108*a*, for example, when the data packet reaches the head of the queue 108*a*.

In various embodiments, the crossbar 112 may route the data packet to the destination output port. For example, the crossbar 112 may route the data packet to the output queue associated with the destination output port. As an example, if output port 104*b* is selected as the destination output port, the crossbar 112 may route the data packet to the output queue 114*b*. The output queue 114*b* may buffer the data packet until the data packet is ready to be passed to the output port 104*b*.

Accordingly, as described above, the route lookup circuitry 106*a* may select the plurality of output ports for the second set of output ports from the first set of output ports, based on congestion information at a first time point prior to the data packet being buffered in the input queue 108a. Additionally, the route selection circuitry 110a may select the destination output port from the second set of output ports, based on congestion information at a second time point after the data packet is buffered in the input queue 108a (e.g., when the data packet is ready to be pulled from the input queue 108a or after the data packet is pulled from the input queue 108a). Selecting the second set of output ports from the first set of output ports may reduce the size of the routing information that is stored in the input queue 108a compared with storing routing information for all of the output ports 104a-c of the first set of output ports. Additionally, the destination output port may be selected from the second set of output ports when the data packet is ready to be pulled from the input queue 108a or after the data packet is pulled from the input queue 108a, thereby allowing the switch 100 to use the most up-to-date congestion information and adapt to any changes in congestion that may occur while the data packet is buffered in the input queue 108a.

In various embodiments, the second set of output ports may include any suitable number of the output ports 104a-c. For example, in some embodiments, the second set of output ports may include two to four output ports, such as two output ports.

In various embodiments, the switch 100 may process deterministic data packets in addition to adaptive data packets. For example, the input port 102a may receive a deterministic data packet that is to be sent to a destination node (e.g., that is coupled to a destination processor). For example, the input port 102a may receive a DLID associated with the deterministic data packet that identifies the destination node.

In various embodiments, the route lookup circuitry 106a may identify a single destination output port (e.g., one of the output ports 104a-c) to which to send the deterministic data packet. The route lookup circuitry 106a may identify the destination output port, for example, based on one or more route tables. The route lookup circuitry 106a may identify the destination output port prior to the deterministic data packet being buffered in the input queue 108a.

The input queue 108a may then buffer the deterministic data packet along with routing information that identifies the destination output port. When the deterministic data packet is ready to be routed to the destination output port, the input queue 108a may pass the deterministic data packet to the crossbar 112. The crossbar 112 may route the deterministic data packet to the destination output port.

In various embodiments, identification of the destination output port for the deterministic data packet prior to the data packet being buffered in the input queue 108a may allow the input queue 108a to use virtual output queuing and/or other mechanisms to store and/or process the data packets within the input queue 108a based on their associated routing information (e.g., their associated destination output port).

Figure 2:
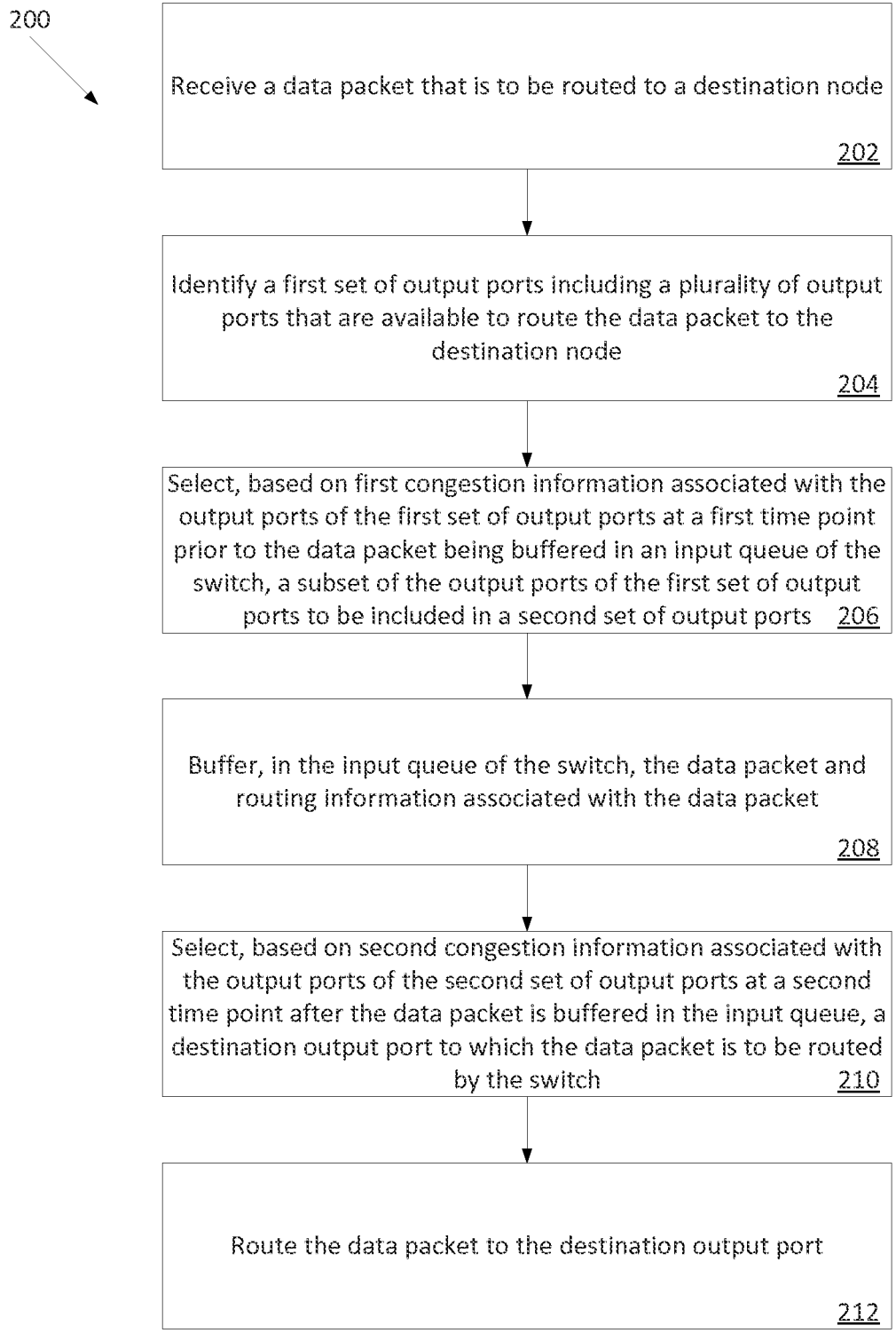
FIG. 2 illustrate a process for routing data in a switch, according to the disclosed embodiments.

FIG. 2 illustrates a method 200 for routing adaptive data in a switch, in accordance with various embodiments. The method 200 may be performed by, for example, switch 100. In some embodiments, a switch may include or have access to one or more non-transitory computer-readable media having instructions, stored thereon, that when executed cause the switch to perform the method 200.

At block 202 of the method 200, the switch may receive a data packet that is to be routed to a destination node. The data packet may be received, for example, by an input port of the switch. In some embodiments, the switch may receive a DLID associated with the data packet to indicate the destination node.

At block 204 of the method 200, the switch may identify a first set of output ports including a plurality of output ports that are available to route the data packet to the destination node. Block 204 may be performed by, for example, route lookup circuitry of the switch.

At block 206 of the method 200, the switch may select, based on first congestion information associated with the output ports of the first set of output ports at a first time point prior to the data packet being buffered in an input queue of the switch, a subset of the output ports of the first set of output ports to be included in a second set of output ports. In embodiments, the second set of output ports may include a plurality of output ports. In some embodiments, the switch may select the output ports of the first set of output ports that have the lowest congestion levels, as indicated by the first congestion information. Block 206 may be performed by, for example, the route lookup circuitry of the switch.

At block 208 of the method 200, the switch may buffer, in the input queue of the switch, the data packet and routing information associated with the data packet. The routing information may include information that identifies the output ports included in the second set of output ports.

At block 210 of the method 200, the switch may select, based on second congestion information associated with the output ports of the second set of output ports at a second time point after the data packet is buffered in the input queue, a destination output port to which the data packet is to be routed by the switch. The destination output port may be selected from the output ports of the second set of output ports. In some embodiments, the second time point may correspond to a time at which the data packet is ready to leave the input queue or a time after the data packet has been removed from the input queue. Block 208 may be performed by, for example, route selection circuitry of the switch.

At block 212 of the method 200, the switch may route the data packet to the destination output port. Block 212 may be performed by, for example, a crossbar of the switch.

Figure 3:
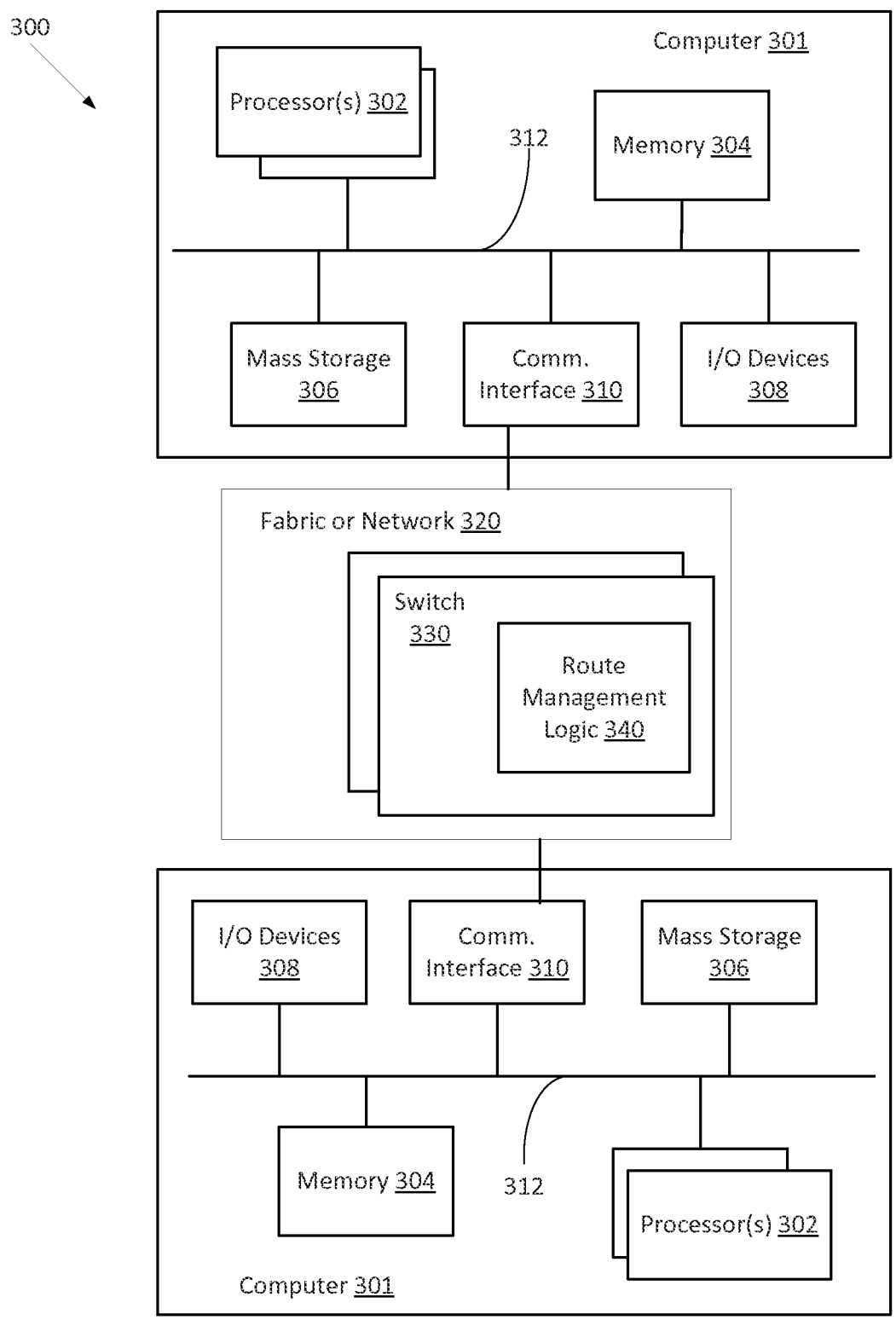
FIG. 3 illustrates an example computing system suitable for use to practice various aspects of the present disclosure, according to the disclosed embodiments.

FIG. 3 illustrates an example computing system 300 (hereinafter "system 300") that may be suitable for use to practice selected aspects of the present disclosure. As shown, system 300 may include a plurality of computers 301, and a fabric or network 320 coupled to the computers. The fabric or network 320 may include a plurality of switches 330 coupled to one another to route data between the computers 301 (e.g., between the processors 302 of the computers 301). One or more of the switches 330 may correspond to the switch 100 described herein and/or may perform the method 200 described herein.

The computers 301 may be coupled to a plurality of the switches 330 to provide multiple routing paths between two computers 301. Although only two computers 301 are shown in FIG. 3, it will be appreciated that the fabric or network 320 and/or switches 330 may be used to route data between any suitable number of computers 301, including more than two computers 301. The switch may include route management logic 340 to perform one or more aspects of the routing process described herein. In some embodiments, the switch 330 may be coupled to the communication interfaces 310 of the computers 301. Alternatively, or additionally, the switch 330 may be coupled to a plurality of processors 302 of a single computer 301 to route data between the processors 302. In some embodiments, the switch 330 may be included in a same package with one or more processors (e.g., in a system-on-chip (SoC)).

The individual computers 301 may include one or more processors or processor cores 302, and system memory 304. For the purpose of this application, including the claims, the terms "processor" and "processor cores" may be considered synonymous, unless the context clearly requires otherwise. Additionally, computer 301 may include mass storage devices 306 (such as diskette, hard drive, compact disc read only memory (CD-ROM) and so forth), input/output devices 308 (such as display, keyboard, cursor control and so forth) and communication interfaces 310 (such as network interface cards, modems and so forth). The elements may be coupled to each other via system bus 312, which may represent one or more buses. In the case of multiple buses, they may be bridged by one or more bus bridges (not shown). Each of these elements may perform its conventional functions known in the art. In some embodiments, the computers 301 may be stationary devices, mobile devices, or servers.

Figure 4:
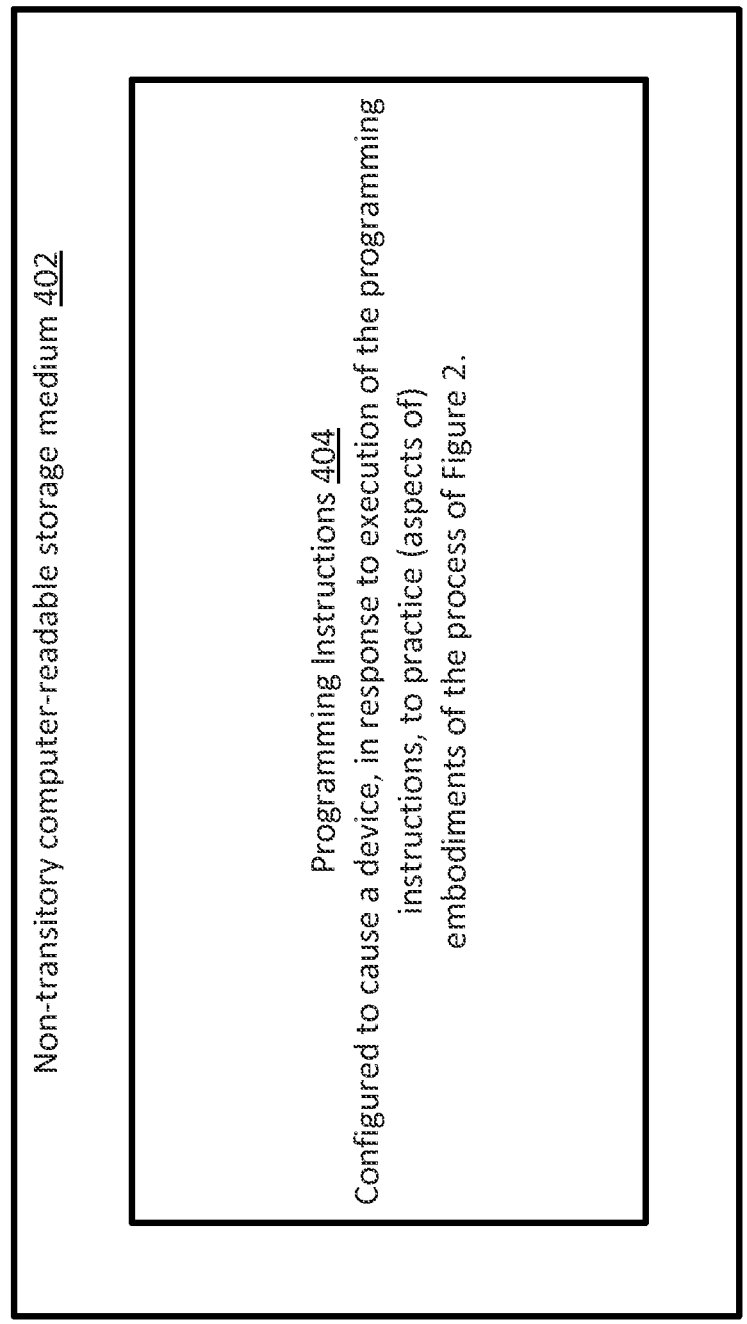
FIG. 4 illustrates a storage medium having instructions for practicing methods described herein, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 4 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 402 may include a number of programming instructions 404. Programming instructions 404 may be configured to enable a device, e.g., switch 100 or switch 330, in response to execution of the programming instructions, to perform the routing process described herein (e.g., the routing process described with respect to FIG. 1 or the method 200 of FIG. 2). In alternate embodiments, programming instructions 404 may be disposed on multiple computer-readable non-transitory storage media 402 instead. In alternate embodiments, programming instructions 404 may be disposed on computer-readable transitory storage media 402, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Some non-limiting Examples of various embodiments are presented below.

Example 1 is a switch comprising: an input port to receive a data packet to be sent to a destination node, and route lookup circuitry coupled to the input port. The route lookup circuitry is to: determine a first plurality of output ports that are available to send the data packet to the destination node; and select a second plurality of output ports from the first plurality of output ports based on respective congestion levels associated with individual output ports of the first plurality of output ports. The switch of Example 1 further includes an input queue coupled to the route lookup circuitry, the input queue to buffer the data packet; and route selection circuitry coupled to the input queue, the route selection circuitry to select an output port to which to send the data packet, from the second plurality of output ports, based on updated congestion levels associated with the second plurality of output ports.

Example 2 is the switch of Example 1, wherein the input queue is further to buffer routing information associated with the data packet including routing information that identifies the output ports of the second set of output ports.

Example 3 is the switch of Example 1, further comprising crossbar circuitry coupled to the route selection circuitry to route the data packet from the input queue to the output port selected from the second plurality of output ports.

Example 4 is the switch of Example 1, wherein the input port is further to receive a destination local identifier (DLID) to identify the destination node.

Example 5 is the switch of Example 1, wherein the route lookup circuitry is to select the second plurality of output ports prior to the data packet being buffered in the input queue.

Example 6 is the switch of Example 5, wherein the route selection circuitry is to select the output port from the second plurality of output ports when the data packet is ready to be pulled out of the input queue or after the data packet is pulled out of the input queue.

Example 7 is the switch of any one of Examples 1 to 6, wherein the data packet is an adaptive data packet.

Example 8 is the switch of Example 7, wherein: the input port is further to receive a deterministic data packet; and the route lookup circuitry is to identify, prior to the deterministic data packet being buffered in the input queue, a single output port to which to send the deterministic data packet.

Example 9 is the switch of Example 1, wherein the second set of output ports includes two output ports.

Example 10 is the switch of Example 1, wherein the switch is included in a device that includes one or more processors coupled to the switch.

Example 11 is the switch of Example 1, wherein the switch includes 64 input ports and 64 output ports.

Example 12 is a method for routing data to be performed by a switch, the method comprising: receiving, by an input port of the switch, a data packet that is to be routed to a destination node; identifying, by route lookup circuitry of the switch, a first plurality of output ports that are available to route the data packet to the destination node; selecting, by the route lookup circuitry of the switch based on first congestion information associated with individual output ports of the first plurality of output ports at a first time point prior to the data packet being buffered in an input queue of the switch, a subset of the first plurality of output ports to be included in a second plurality of output ports; and selecting, by route selection circuitry of the switch based on second congestion information associated with individual output ports of the second plurality of output ports at a second time point after the data packet is buffered in the input queue, a destination output port to which the data packet is to be routed by the switch.

Example 13 is the method of Example 12, further comprising buffering, in the input queue, the data packet and routing information associated with the data packet, the routing information to include routing information that identifies the output ports included in the second plurality of output ports.

Example 14 is the method of Example 12, further comprising routing the data packet from the input queue to the destination output port.

Example 15 is the method of Example 12, wherein receiving the data packet comprises receiving an adaptive data packet.

Example 16 is the method of Example 12, further comprising: receiving a deterministic data packet; and identifying, prior to the deterministic data packet being buffered in the input queue, a single output port to which to send the deterministic data packet.

Example 17 is the method of Example 12, wherein the second time point corresponds to a time at which the data packet is ready to leave the input queue or a time after the data packet has been removed from the input queue.

Example 18 is one or more non-transitory computer-readable media having instructions, stored thereon, that when executed by one or more processors cause a switch to perform the method of any one of Examples 12 to 17.

Example 19 is a computing system comprising: a plurality of processors; and a switch coupled to the plurality of processors to route data between the plurality of processors. The switch of Example 19 includes: an input port to receive an adaptive data packet and an associated destination local identifier (DLID) to indicate a destination node for the data packet. The switch of Example 19 further includes route lookup circuitry coupled to the input port, the route lookup circuitry to: determine a first set of output ports including a plurality of output ports that are available to send the data packet to the destination node; obtain first congestion information associated with the output ports of the first set of output ports; and select, from the output ports of the first set of output ports, a plurality of output ports for a second set of output ports based on the first congestion information, the second set of output ports to include a subset of the output ports of the first set of output ports. The switch of Example 19 further includes an input queue coupled to the route lookup circuitry, the input queue to store the data packet and route information to identify the output ports of the second set of output ports.

Example 20 includes the system of Example 19, further comprising route selection circuitry coupled to the input queue, the route selection circuitry to: obtain second congestion information associated with the output ports of the second set of output ports; and select a destination output port to which to route the data packet, from the second set of output ports based on the second congestion information.

Example 21 is the system of Example 20, wherein the switch further comprises a crossbar coupled to the route selection circuitry to route the data packet from the input queue to the destination output port.

Example 22 is the system of Example 20, wherein the route selection circuitry is to select the destination output port when the data packet is ready to be removed from the input queue or after the data packet is removed from the input queue.

Example 23 is the system of Example 19, wherein the switch includes 64 input ports and 64 output ports.

Example 24 is the system of Example 19, wherein: the input port is further to receive a deterministic data packet that is to be deterministically routed; and the route lookup circuitry is to identify, prior to the deterministic data packet being buffered in the input queue, a single output port to which to send the deterministic data packet.

Example 25 is the system of Example 19, further comprising a fabric or network that includes the switch coupled with a plurality of other switches to route data between the plurality of processors.

Example 26 is a switch comprising: means to identify a first plurality of output ports that are available to send a data packet to a destination node; means to select, based on first congestion information associated with individual output ports of the first plurality of output ports at a first time point prior to the data packet being buffered in an input queue of the switch, a subset of the first plurality of output ports to be included in a second set of output ports; and means to select, based on second congestion information associated with individual output ports of the second plurality of output ports at a second time point after the data packet is buffered in the input queue, a destination output port to which the data packet is to be routed by the switch.

Example 27 is the switch of Example 26, further comprising means to buffer, in the input queue, the data packet and routing information associated with the data packet, the routing information to include routing information that identifies the output ports included in the second plurality of output ports.

Example 28 is the switch of Example 26, further comprising means to route the data packet from the input queue to the destination output port.

Example 29 is the switch of Example 26, wherein the data packet is an adaptive data packet.

Example 30 is the switch of Example 29, further comprising: means to receive a deterministic data packet; and means to identify, prior to the deterministic data packet being buffered in the input queue, a single output port to which to send the deterministic data packet.

Example 31 is the switch of any one of Examples 26 to 30, wherein the second time point corresponds to a time at which the data packet is ready to leave the input queue or a time after the data packet has been removed from the input queue.

Example 32 is one or more non-transitory computer-readable media comprising instructions to cause a switch, upon execution of the instructions by one or more processors of the switch, to: identify a first plurality of output ports that are available to send a data packet to a destination node; select, based on first congestion information that indicates congestion associated with individual output ports of the first plurality of output ports at a first time point prior to the data packet being buffered in an input queue of the switch, a subset of the first plurality of output ports to be included in a second plurality of output ports; and select, based on second congestion information that indicates congestion associated with individual output ports of the second plurality of output ports at a second time point after the data packet is buffered in the input queue, a destination output port to which the data packet is to be routed by the switch.

Example 33 is the one or more non-transitory computer-readable media of Example 32, wherein the instructions, when executed, further cause the switch to buffer, in the input queue, the data packet and routing information associated with the data packet, the routing information to include routing information that identifies the output ports included in the second plurality of output ports.

Example 34 is the one or more non-transitory computer-readable media of Example 32, wherein the instructions, when executed, further cause the switch to route the data packet from the input queue to the destination output port.

Example 35 is the one or more non-transitory computer-readable media of Example 32, wherein the data packet is an adaptive data packet.

Example 36 is the one or more non-transitory computer-readable media of Example 32, wherein the instructions, when executed, further cause the switch to: receive a deterministic data packet; and identify, prior to the deterministic data packet being buffered in the input queue, a single output port to which to send the deterministic data packet.

Example 37 is the one or more non-transitory computer-readable media of any one of Examples 32 to 36, wherein the second time point corresponds to a time at which the data packet is ready to leave the input queue or a time after the data packet has been removed from the input queue.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A switch comprising:
    an input port to receive a data packet to be sent to a destination node;
    route lookup circuitry coupled to the input port, the route lookup circuitry to:
        determine a first plurality of output ports that are available to send the data packet to the destination node;
        obtain first congestion levels associated with respective individual output ports of the first plurality of output ports; and
        select a second plurality of output ports from the first plurality of output ports based on the respective first congestion levels, wherein the second plurality of output ports is a subset of less than all of the first plurality of output ports;
    an input queue coupled to the route lookup circuitry, the input queue to buffer the data packet after the selection of the second plurality of output ports; and
    route selection circuitry coupled to the input queue, the route selection circuitry to:
        obtain, after the data packet is buffered in the input queue, second congestion levels associated with respective individual output ports of the second plurality of output ports, wherein the second congestion levels are updated versions of the first congestion levels for the second plurality of output ports; and
        select, after the data packet is buffered in the input queue, an output port to which to send the data packet, from the second plurality of output ports, based on the second congestion levels.

2. The switch of claim 1, wherein the input queue is further to buffer routing information associated with the data packet including routing information that identifies the output ports of the second plurality of output ports.

3. The switch of claim 1, further comprising crossbar circuitry coupled to the route selection circuitry to route the data packet from the input queue to the output port selected from the second plurality of output ports.

4. The switch of claim 1, wherein the input port is further to receive a destination local identifier (DLID) to identify the destination node.

5. The switch of claim 1, wherein the route selection circuitry is to select the output port from the second plurality of output ports when the data packet is ready to be pulled out of the input queue or after the data packet is pulled out of the input queue.

6. The switch of claim 1, wherein the data packet is an adaptive data packet.

7. The switch of claim 6, wherein:
    the input port is further to receive a deterministic data packet; and
    the route lookup circuitry is to identify, prior to the deterministic data packet being buffered in the input queue, a single output port to which to send the deterministic data packet.

8. The switch of claim 1, wherein the second plurality of output ports includes two output ports.

9. The switch of claim 1, wherein the switch is included in a device that includes one or more processors coupled to the switch.

10. The switch of claim 1, wherein the switch includes 64 input ports and 64 output ports.

11. A method for routing data to be performed by a switch, the method comprising: receiving, by an input port of the switch, a data packet that is to be routed to a destination node;
    identifying, by route lookup circuitry of the switch, a first plurality of output ports that are available to route the data packet to the destination node;
    selecting, by the route lookup circuitry of the switch based on first congestion information associated with individual output ports of the first plurality of output ports at a first time point prior to the data packet being buffered in an input queue of the switch, a subset of the first plurality of output ports to be included in a second plurality of output ports; and
    selecting, by route selection circuitry of the switch based on second congestion information associated with individual output ports of the second plurality of output ports at a second time point after the data packet is buffered in the input queue, a destination output port to which the data packet is to be routed by the switch, wherein the second congestion information is different from the first congestion information.

12. The method of claim 11, further comprising buffering, in the input queue, the data packet and routing information associated with the data packet, the routing information to include routing information that identifies the output ports included in the second plurality of output ports.

13. The method of claim 11, further comprising routing the data packet from the input queue to the destination output port.

14. The method of claim 11, wherein receiving the data packet comprises receiving an adaptive data packet.

15. The method of claim 11, further comprising:
    receiving a deterministic data packet; and
    identifying, prior to the deterministic data packet being buffered in the input queue, a single output port to which to send the deterministic data packet.

16. The method of claim 11, wherein the second time point corresponds to a time at which the data packet is ready to leave the input queue or a time after the data packet has been removed from the input queue.

17. A computing system comprising:
    a plurality of processors;
    a switch coupled to the plurality of processors to route data between the plurality of processors, the switch comprising:
        an input port to receive an adaptive data packet and an associated destination local identifier (DLID) to indicate a destination node for the data packet;
        route lookup circuitry coupled to the input port, the route lookup circuitry to:
            determine a first set of output ports including a plurality of output ports that are available to send the data packet to the destination node;
            obtain first congestion information associated with the output ports of the first set of output ports; and select, from the output ports of the first set of output ports, a plurality of output ports for a second set of output ports based on the first congestion information, the second set of output ports to include a subset of the output ports of the first set of output ports;
an input queue coupled to the route lookup circuitry, the input queue to, after the selection of the plurality of output ports for the second set of output ports, store the data packet and route information to identify the output ports of the second set of output ports; and
route selection circuitry coupled to the input queue, the route selection circuitry to:
  obtain, after storage of the data packet and route information by the input queue, second congestion information associated with the output ports of the second set of output ports, wherein the second congestion information is different than the first congestion information; and
  select, from the second set of output ports based on the second congestion information, a destination output port to which to route the data packet.

18. The system of claim 17, wherein the switch further comprises a crossbar coupled to the route selection circuitry to route the data packet from the input queue to the destination output port.

19. The system of claim 17, wherein the route selection circuitry is to select the destination output port when the data packet is ready to be removed from the input queue or after the data packet is removed from the input queue.

20. The system of claim 17, wherein the switch includes 64 input ports and 64 output ports.

21. The system of claim 17, wherein:
the input port is further to receive a deterministic data packet that is to be deterministically routed; and
the route lookup circuitry is to identify, prior to the deterministic data packet being buffered in the input queue, a single output port to which to send the deterministic data packet.

22. The system of claim 17, further comprising a fabric or network that includes the switch coupled with a plurality of other switches to route data between the plurality of processors.

\* \* \* \* \*